United States Patent
Yamada et al.

(10) Patent No.: US 12,515,585 B2
(45) Date of Patent: Jan. 6, 2026

(54) CONTROL METHOD

(71) Applicant: TOYOTA JIDOSHA KABUSHIKI KAISHA, Toyota (JP)

(72) Inventors: Kenichi Yamada, Nisshin (JP); Toshiki Kashiwakura, Tokyo (JP); Akane Umezu, Nagoya (JP); Kayo Tsumoto, Nisshin (JP); Yuta Shishime, Tokyo (JP); Satoshi Komamine, Nagoya (JP); Kenji Ishiyama, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 18/468,196

(22) Filed: Sep. 15, 2023

(65) Prior Publication Data

US 2024/0198905 A1    Jun. 20, 2024

(30) Foreign Application Priority Data

Dec. 14, 2022   (JP) .................... 2022-199779

(51) Int. Cl.
*B60Q 9/00* (2006.01)
*B60R 25/01* (2013.01)
*B60R 25/24* (2013.01)

(52) U.S. Cl.
CPC ............. *B60Q 9/00* (2013.01); *B60R 25/01* (2013.01); *B60R 25/241* (2013.01)

(58) Field of Classification Search
CPC .......... B60Q 9/00; B60R 25/01; B60R 25/241
See application file for complete search history.

(56) References Cited

U.S. PATENT DOCUMENTS

| | | | | |
|---|---|---|---|---|
| 7,106,171 | B1* | 9/2006 | Burgess | G07C 9/00182 340/426.36 |
| 8,285,437 | B2* | 10/2012 | Kubota | G07C 5/085 701/32.5 |
| 8,717,170 | B1* | 5/2014 | Juhasz | B60L 53/63 340/5.2 |
| 9,014,888 | B2* | 4/2015 | Sukkarie | G01C 21/26 701/22 |
| 9,818,088 | B2* | 11/2017 | Penilla | G01M 17/007 |
| 10,529,161 | B2* | 1/2020 | Ma | E05B 49/00 |
| 2011/0099392 | A1* | 4/2011 | Conway | G06F 1/329 713/300 |
| 2011/0246252 | A1* | 10/2011 | Uesugi | G06Q 10/10 705/7.12 |
| 2012/0007554 | A1 | 1/2012 | Kanamori et al. | |
| 2019/0197808 | A1 | 6/2019 | Jinnai et al. | |

(Continued)

FOREIGN PATENT DOCUMENTS

| | | |
|---|---|---|
| JP | 2012-019636 A | 1/2012 |
| JP | 2012-135148 A | 7/2012 |
| JP | 2019-116809 A | 7/2019 |

(Continued)

*Primary Examiner* — Gertrude Arthur Jeanglaude
(74) *Attorney, Agent, or Firm* — SoraIP, Inc.

(57) ABSTRACT

A control method executed by a computer configured to be able to communicate with a vehicle includes: storing a work item included in a charging operation to the vehicle and a work time of the work item in association with each other; and outputting an alert when an end notification of the work item is not received from the vehicle before the work time.

16 Claims, 5 Drawing Sheets

(56) References Cited

U.S. PATENT DOCUMENTS

2021/0167607 A1  6/2021  Masuda et al.
2021/0370882 A1  12/2021  Morosawa et al.

FOREIGN PATENT DOCUMENTS

| JP | 2021-015800 A | 2/2021 |
| JP | 2021-121885 A | 8/2021 |
| JP | 2021-189611 A | 12/2021 |

* cited by examiner

CONTROL METHOD

CROSS-REFERENCE TO RELATED APPLICATION

This application claims priority to Japanese Patent Application No. 2022-199779 filed on Dec. 14, 2022, incorporated herein by reference in its entirety.

BACKGROUND

1. Technical Field

The present disclosure relates to a control method.

2. Description of Related Art

A technique for improving the convenience of a service for charging a vehicle by dispatching an operator is known. For example, Japanese Unexamined Patent Application Publication No. 2021-121885 (JP 2021-121885 A) discloses a charging reservation system in which a charging service is reserved by a third party when it is determined that a battery charge amount of a vehicle is equal to or less than a predetermined value.

SUMMARY

A service for charging a vehicle by dispatching an operator is required to further improve its convenience. For example, it is required to reduce the anxiety of the user of the service in terms of security associated with the charging operation such that the operator can charge the vehicle even in a state where the user is not present at the site.

An object of the present disclosure made in view of these circumstances is to improve the convenience of the service for charging the vehicle by dispatching the operator.

A control method according to an embodiment of the present disclosure is a control method executed by a computer configured to be able to communicate with a vehicle, and the control method includes storing an operation item included in a charging operation to the vehicle and an operation time of the operation item in association with each other; and outputting an alert when an end notification of the operation item is not received from the vehicle before the operation time expires after a start notification of the operation item is received from the vehicle.

With the embodiment according to the present disclosure, it is possible to improve the convenience of the service for charging the vehicle by dispatching the operator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
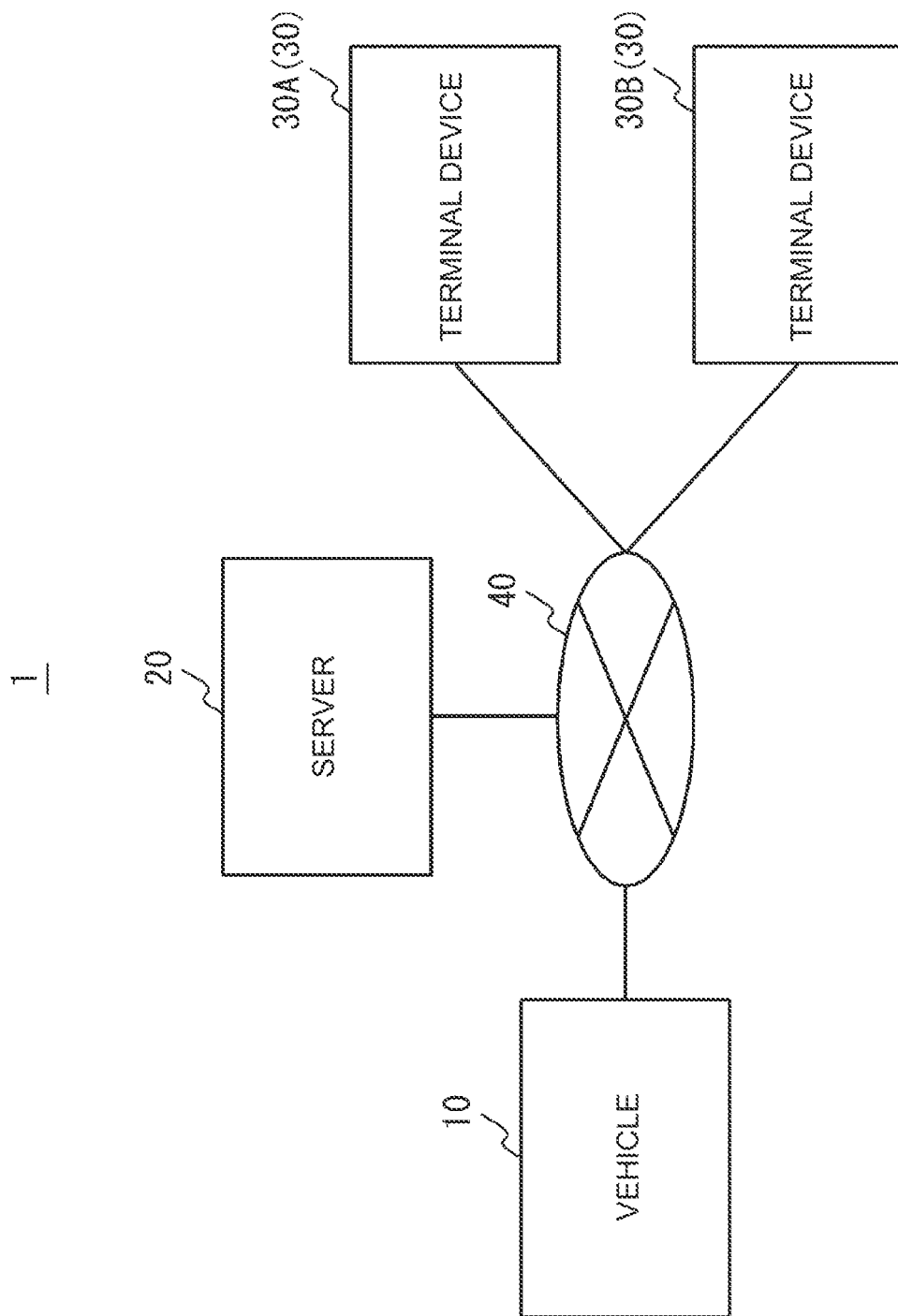
FIG. 1 is a block diagram illustrating a schematic configuration of a vehicle charge management system according to an embodiment of the present disclosure.

With reference to FIG. 1, an outline of a vehicle charge management system 1 according to an embodiment of the present disclosure will be described. FIG. 1 is a block diagram illustrating a schematic configuration of a vehicle charge management system 1. The vehicle charge management system 1 includes a vehicle 10, servers 20, and terminal devices 30A and 30B.

The vehicle 10 is any vehicle such as a passenger car, a bus, a truck, or a motorcycle. In the present embodiment, the vehicle 10 is a vehicle equipped with a battery, and is, for example, Hybrid Electric Vehicle (HEV), Plug-in Hybrid Electric Vehicle (PHEV), Battery Electric Vehicle (BEV), or the like. However, the vehicle 10 is not limited to the above-described vehicle, and may be any vehicle equipped with a battery. The vehicle 10 may be an autonomous vehicle that can travel by autonomous driving. The level of autonomous driving is, for example, any one of level 1 to level 5 in the level division of Society of Automotive Engineers (SAE). However, the vehicle 10 may be driven by a driver or may be driven by remote control.

The server 20 includes one or more computers. In the present embodiment, it is assumed that the server 20 is configured by one computer. However, the server 20 may be constituted by a plurality of computers capable of communicating with each other, such as a cloud computing system.

The terminal device 30A and 30B are, for example, smart phones, but are not limited thereto, and may be any computer such as a personal computer and a tablet terminal. It is assumed that the terminal device 30A is a terminal device used by a user of the vehicle-charging service. Further, it is assumed that the terminal device 30B is a terminal device used by a worker of the vehicle-charging service. In the following explanation, the terminal device 30A and 30B are simply collectively referred to as the terminal device 30 when they are not particularly distinguished from each other.

FIG. 1 shows vehicles 10 and servers 20 one by one, and two terminal devices 30 (30A and 30B) for convenience of explanation. However, the vehicle charge management system 1 may include any number of vehicles 10, servers 20, and terminal devices 30. The vehicle 10, the server 20, and the terminal device 30 are communicably connected to a network 40 including, for example, the Internet and a mobile communication network.

First, the outline of the present embodiment will be described, and the details will be described later. The vehicle charge management system 1 is used, for example, to provide a vehicle charging service in which an operator is dispatched to charge the vehicle. The server 20 stores a work item included in the charging work to the vehicle 10 and the work time in association with each other. After receiving the start notification of the work item from the vehicle 10, the server 20 outputs an alert when the end notification of the work item is not received from the vehicle 10 before the work time expires.

As described above, according to the present embodiment, an alert is output to, for example, a user or a terminal device of a worker in a case where it takes more time than expected for a predetermined work by the worker or in a case where the worker leaves the site without using a key of the vehicle. Thus, even in a case where the user who is the owner of the vehicle 10 or the like leaves the charging work of the vehicle to the worker in a state where the user is not present at the site, it is possible to reduce the anxiety of the user. Therefore, according to the present embodiment, it is possible to improve the convenience of the service of dispatching the worker to charge the vehicle.

Figure 2:
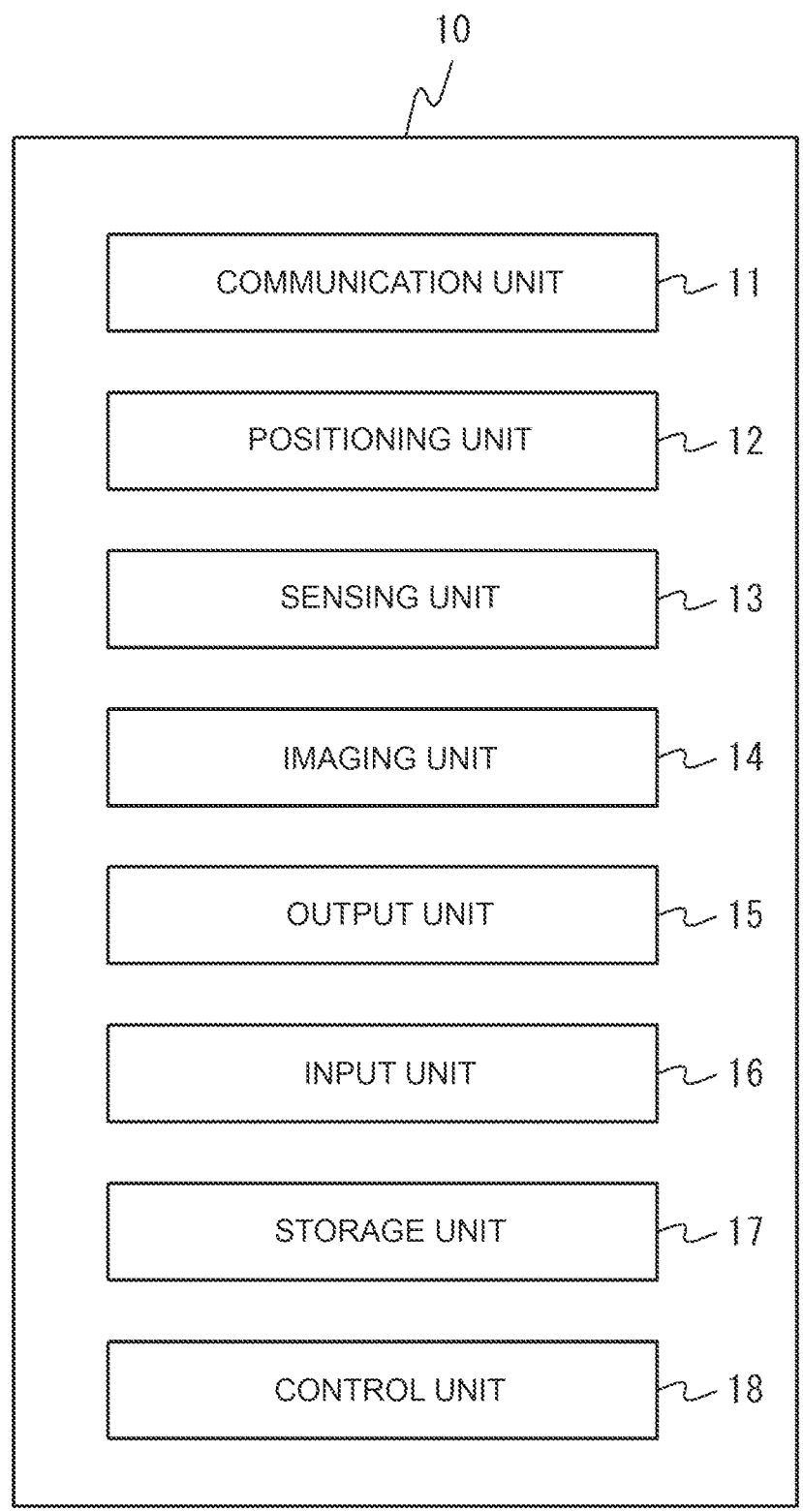
FIG. 2 is a block diagram illustrating a schematic configuration of a vehicle.
Figure 3:
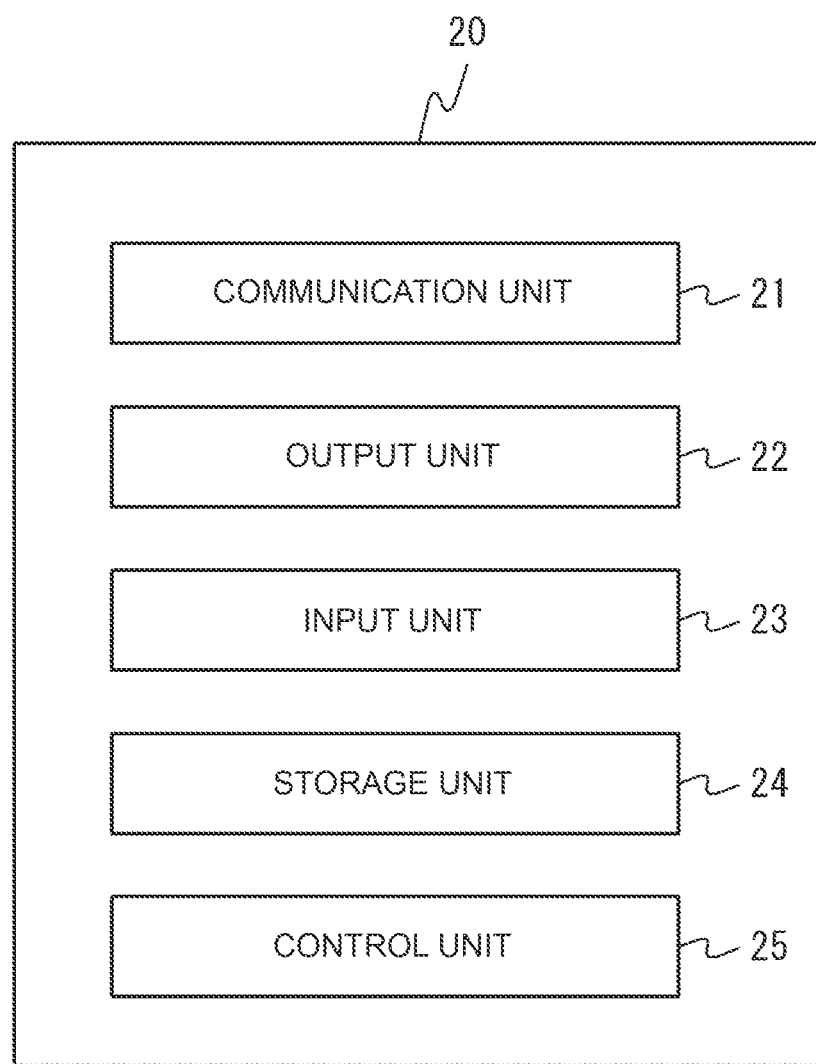
FIG. 3 is a block diagram illustrating a schematic configuration of a server.

Next, each configuration of the vehicle charge management system 1 will be described in detail with reference to FIGS. 2 and 3. FIG. 2 is a block diagram showing a schematic configuration of the vehicle 10. FIG. 3 is a block diagram showing a schematic configuration of the server 20.

Configuration of Vehicle

As illustrated in FIG. 2, the vehicle 10 includes a communication unit 11, a positioning unit 12, a sensing unit 13, an imaging unit 14, an output unit 15, an input unit 16, a storage unit 17, and a control unit 18. The communication unit 11, the positioning unit 12, the sensing unit 13, the imaging unit 14, the output unit 15, the input unit 16, the storage unit 17, and the control unit 18 are communicably connected to each other via, for example, an in-vehicle network such as a Controller Area Network (CAN) or a dedicated line.

The communication unit 11 includes a communication module for connecting to the network 40. The communication module is a communication module compliant with a mobile communication standard such as 4th Generation (4G) or 5th Generation (5G). The communication module may be, for example, a wired Local Area Network (LAN) or a communication module compliant with a standard such as a wireless LAN. The communication module may be a communication module compliant with a short-range wireless communication standard such as Wi-Fi (registered trademark), Bluetooth (registered trademark), or infrared communication. In the present embodiment, the vehicle 10 is connected to the network 40 via the communication unit 11. Accordingly, the vehicle 10 can communicate with the server 20 and the like.

The positioning unit 12 includes one or more positioning devices capable of generating position information of the vehicle 10. The position information of the vehicle 10 is, for example, a coordinate such as a two-dimensional coordinate or a three-dimensional coordinate of a place where the vehicle 10 is present.

The positioning unit 12 generates position information of the vehicle 10 by navigation using a satellite positioning system, autonomous navigation, or a combination thereof. The positioning unit 12 may include a receiver corresponding to a satellite positioning system such as Global Positioning System (GPS) to generate position data of the vehicles 10 by navigation using the satellite positioning system. The positioning unit 12 may include a sensor such as an acceleration sensor or a gyro sensor in order to generate position information of the vehicle 10 by autonomous navigation.

The sensing unit 13 includes one or more sensors. The sensing unit 13 is configured to generate information indicating the start or end of a work item included in the charging operation to the vehicle 10. The information indicating the start or end of the work item is, for example, the opening and closing of a door of a room of the vehicle 10, the operation of a lever or a button, the opening and closing of a cover of a charging port for the vehicle 10, the connection of a charging connector to the charging port, or the like, but is not limited thereto. The sensing unit 13 includes, for example, a displacement sensor, a contact sensor, an infrared sensor, an illuminance sensor, or the like, but is not limited thereto.

The imaging unit 14 includes one or more cameras. The camera may be any camera capable of capturing an image, such as a visible light camera or an infrared camera. The image captured by the imaging unit 14 may be a still image or a moving image. The imaging unit 14 can capture an image of the inside or outside of the vehicle 10.

The output unit 15 includes one or more output devices. The output device is, for example, a display, a speaker, or a lamp. The output unit 15 outputs an image, sound, light, or the like.

The input unit 16 includes one input device. The input device is, for example, a touch panel, a camera, a lever, or a button. The input unit 16 receives an input operation from a user.

The storage unit 17 is, for example, a semiconductor memory, a magnetic memory, an optical memory, or the like. The storage unit 17 may function as, for example, a main storage device, an auxiliary storage device, or a cache memory. The storage unit 17 stores arbitrary information used for the operation of the vehicle 10. For example, the storage unit 17 stores a system program, an application program, embedded software, or the like. The information stored in the storage unit 17 may be updatable by, for example, information acquired from the network 40 via the communication unit 11.

The control unit 18 includes one or more processors. The processor may be, for example, a general-purpose processor such as a Central Processing Unit (CPU), or a dedicated processor specialized for a particular process. The control unit 18 is not limited to the processor, and may include one or more dedicated circuits. The dedicated circuitry may be, for example, Field-Programmable Gate Array (FPGA), or Application Specific Integrated Circuit (ASIC). The control unit 18 controls the respective constituent elements in order to realize the functions of the vehicle 10 including the functions of the constituent elements such as the communication unit 11, the positioning unit 12, the sensing unit 13, the imaging unit 14, the output unit 15, the input unit 16, and the storage unit 17 described above. The control unit 18 may be, for example, a computer such as an Autonomous Driving System (ADS) of the vehicle 10, an Advanced Driver Assistance Systems (ADAS), an Electronic Control Unit (ECU), or a car navigation system.

Configuration of Server

As illustrated in FIG. 3, the server 20 includes a communication unit 21, an output unit 22, an input unit 23, a storage unit 24, and a control unit 25. The communication unit 21, the output unit 22, the input unit 23, the storage unit 24, and the control unit 25 are connected wired or wireless so that they can communicate with each other.

The communication unit 21 includes a communication module for connecting to the network 40. The communication module is a communication module compliant with a mobile communication standard such as 4G or 5G. The communication module may be a communication module compliant with a standard such as a wired LAN or a wireless LAN. The communication module may be a communication module compliant with a short-range wireless communication standard such as Wi-Fi, Bluetooth, or infrared communication. In the present embodiment, the server 20 is connected to the network 40 via the communication unit 21. Accordingly, the server 20 can communicate with the vehicle 10, the terminal device 30, and the like.

Output 22 includes one or more output devices. The output device is, for example, a display, a speaker, or a lamp. The output unit 22 outputs an image, sound, light, or the like.

The input unit 23 includes one input device. The input device is, for example, a touch panel, a camera, a lever, or a button. The input unit 23 receives an input operation from a user.

The storage unit 24 is, e.g., a semiconductor memory, a magnetic memory, or an optical memory. The storage unit 24 may function as, e.g., a main storage device, an auxiliary storage device, or a cache memory. The storage unit 24 stores arbitrary information used for the operation of the server 20. The storage unit 24 stores, e.g., a system program, an application program, or embedded software. The information stored in the storage unit 24 may be updatable with, e.g., information that is acquired from the network 40 via the communication unit 21.

The control unit 25 includes one or more processors. The processor may be, e.g., a general-purpose processor such as a CPU or a dedicated processor specialized in specific processing. The control unit 25 need not necessarily include the processor(s) and may include one or more dedicated circuits. Each dedicated circuit may be, for example, an FPGA or an ASIC. The control unit 25 controls the respective constituent elements in order to realize the functions of the server 20 including the functions of the constituent elements such as the communication unit 21, the output unit 22, the input unit 23, and the storage unit 24 described above.

Operation of the Vehicle Charge Management System

Figure 4:
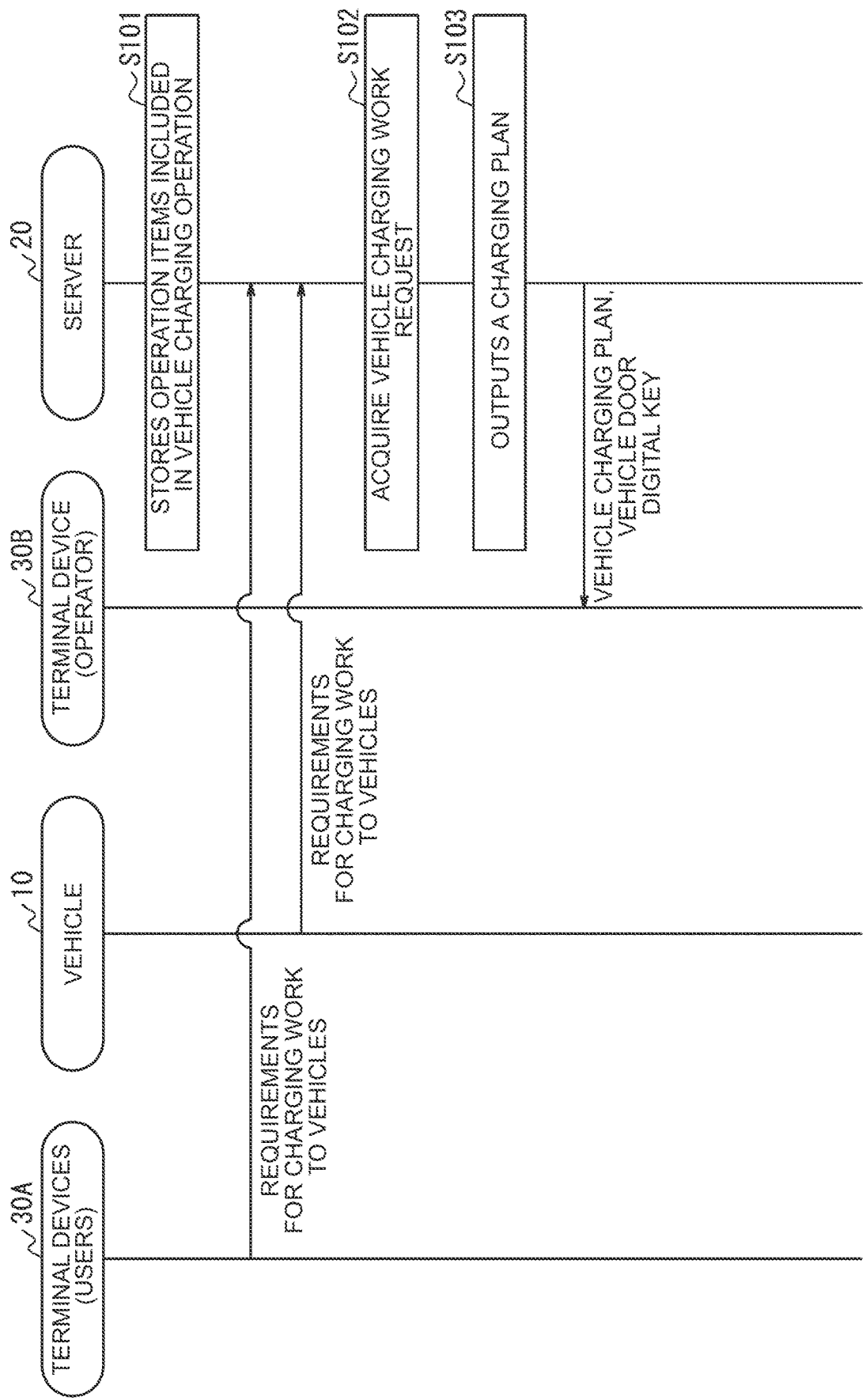
FIG. 4 is a flow chart illustrating a first operation of the vehicle charge management system.
Figure 5:
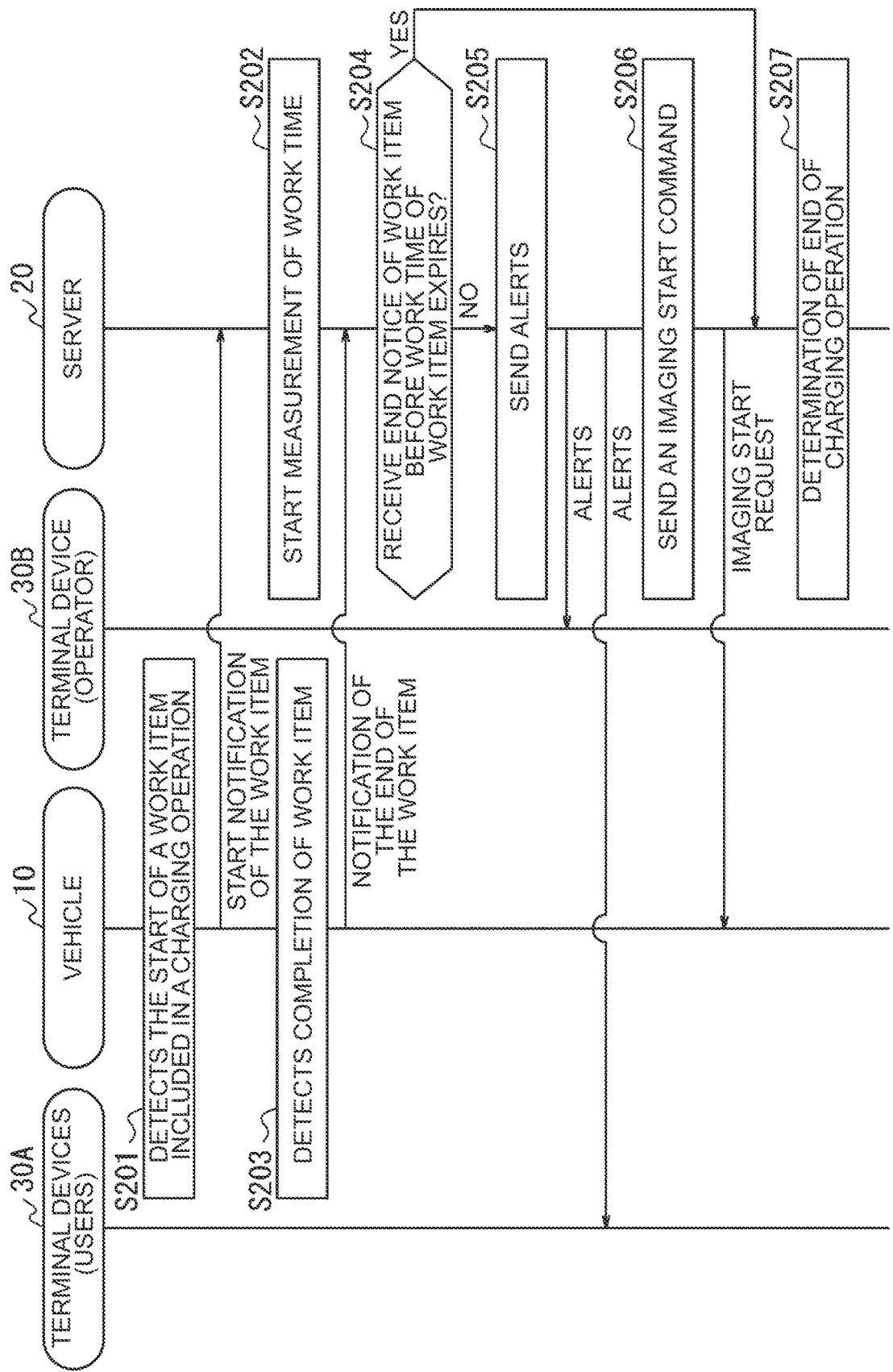
FIG. 5 is a flow chart illustrating a second operation of vehicle charge management system.

The operation of the vehicle charge management system 1 will be described with reference to FIGS. 4 and 5. FIG. 4 is a flowchart illustrating a first operation of the vehicle charge management system 1. FIG. 5 is a flowchart illustrating a second operation of the vehicle charge management system 1. In the flowcharts illustrated in FIGS. 4 and 5, operations of the vehicle 10, the server 20, and the terminal device 30 included in the vehicle charge management system 1 are illustrated. Therefore, the description of this operation corresponds to a control method of the vehicle charging management system 1, and corresponds to a control method of each of the vehicle 10, the server 20, and the terminal device 30 included in the vehicle charge management system 1.

First, a first operation of the vehicle charge management system 1 will be described with reference to FIG. 4. The first operation is the operation of the vehicle charge management system 1 before the operator performs the charging operation of the vehicle 10.

In S101, the control unit 25 of the server 20 stores, in the storage unit 24, the work items included in the charge work to the vehicle 10 and the work times of the work items in association with each other.

The charging operation for the vehicle 10 includes one or more work items. The operation of charging the vehicle 10 may include, as work items, (1) unlocking a door of a room of the vehicle 10 using a digital key, (2) opening a cover of a charging port of the vehicle 10 by operating a lever or a button such as a driver's seat, or (3) connecting a charging connector of a charger to a charging port of the vehicle 10 to charge a battery of the vehicle 10. However, the work items included in the charging work to the vehicle 10 are not limited to these. In addition, the work item and the work time thereof may be different depending on the vehicle type, model, and the like of the vehicle 10.

In S102, the control unit 25 of the servers 20 acquires a charge operation request to the vehicles 10.

For example, the control unit 25 of the server 20 may receive a charge operation request of the vehicle 10 from the vehicle 10 or the terminal device 30A of the user via the communication unit 21. The charging work request of the vehicle 10 may include, for example, identification information of the vehicle 10 and information of a work place. The identification information of the vehicle 10 is, for example, information uniquely paid out by the server 20, but may be an automobile registration number or the like described on the license plate of the vehicle 10. The work place information may be, for example, position information of the vehicle 10 generated by the positioning unit 12 of the vehicle 10. However, the information included in the charging work request to the vehicle 10 is not limited thereto, and may include a digital key of a door of the vehicle 10, a remaining charge amount of a battery of the vehicle 10, a work time period, and the like. The control unit 25 may store the acquired charging work request of the vehicle 10 in the storage unit 24.

In S103, the control unit 25 of the servers 20 outputs a charge operation plan of the vehicles 10.

For example, the control unit 25 of the server 20 may generate the charging work plan of the vehicle 10 based on the charging work items and the working hours stored in S101 and the charging work requests to the vehicle 10 acquired in S102. At this time, the control unit 25 can determine the vehicle type, the type, and the like of the vehicle 10 based on the identification information of the vehicle 10, and can adopt the work item and the work time of the charging work according to the determined type, the type, and the like. Further, the control unit 25 may change the work time of each work item based on at least one of the vehicle information of the vehicle 10, the environment information of the charging work, or the past work history information.

The vehicle information of the vehicle 10 includes information such as a vehicle type or a model of the vehicle 10. For example, in a case where the control unit 25 of the server 20 determines that the vehicle corresponds to a vehicle that is difficult to perform the charging operation, for example, the position of the room of the vehicle 10 is high, access to a lever, a button, a charging port, or the like is physically restricted in the structure of the vehicle 10 based on the vehicle information of the vehicle 10, the control unit may change at least one work time of the work items (1) to (3) for a long time.

The environment information of the charging work includes arbitrary information on the environment of the site where the charging work is performed, such as information on the work place (a stop position of the vehicle 10), a work time zone, and weather. For example, the control unit 25 of the server 20 may change the operation time of the operation item for a long time when it is determined that the charging operation is performed under an environment in which the charging operation is difficult, such as nighttime or rainy weather, based on the environment information of the charging operation.

The past work history information includes the actual value of the work time of the charging work by the same or another worker. For example, the control unit 25 of the server 20 may change the work time of the work item for a long time when it is determined that a predetermined number of times or more or a predetermined percentage or more of the work time has been exceeded in the past on the basis of the past work history information, or when it is determined that the worker has not been in charge of charging the vehicle of the same type as the vehicle 10 in the past. As described above, by changing the work time of the work item included in the charging work plan based on the additional information, it is possible to improve the output accuracy of the alert in the subsequent processing.

In S103, the control unit 25 of the server 20 may transmit the generated charge operation plan of the vehicle 10 to the terminal device 30B of the worker via the communication unit 21. At this time, the control unit 25 may transmit information necessary for the charging operation together with the charging operation plan of the vehicle 10. The information necessary for the charging operation is, for example, a digital key of a door of the vehicle 10, but is not limited thereto. That is, the control unit 25 may transmit the digital key of the door of the vehicle 10 to the terminal device 30B associated with the worker performing the charging operation. Thus, even in a state where the user of the service is not present at the site, the worker can perform the charging work of the vehicle.

Next, a second operation of the vehicle charge management system 1 will be described with reference to FIG. 5. The second operation is the operation of the vehicle charge management system 1 during the charging operation of the vehicle 10 by the worker.

In the description of this operation, when the charging operation of the vehicle 10 is performed, the worker operates the work vehicle equipped with the charger in accordance with the charging work plan of the vehicle 10 output in the first operation, and moves to the stop position of the vehicle 10. Then, the worker performs the charging operation of the vehicle 10 according to the charging operation plan of the vehicle 10 transmitted to the terminal device 30B of the worker. Further, it is assumed that the control unit 25 of the server 20 stores, in the storage unit 24, the work item included in the charging work to the vehicle 10 and the work time of the work item described above in the first operation in association with each other.

In S201, the control unit 18 of the vehicle 10 detects that the operation items included in the operation of charging the vehicle 10 have been started.

An arbitrary method can be used to detect that a work item has been started. For example, the control unit 18 of the vehicle 10 may detect information indicating that a work item has been disclosed via the communication unit 11, the sensing unit 13, the input unit 16, or the like. For example, when the work item is to (1) unlock the door of the living room of the vehicle 10 using the predetermined digital key, the control unit 18 may detect that the work item has been started by receiving an unlocking request accompanied by the predetermined digital key via the communication unit 11. When the work item is (2) to open the cover of the charging port of the vehicle 10 by operating a lever or a button such as under the driver's seat, the control unit 18 may detect that the work item has been started by the lever or the button as the input unit 16 accepting a predetermined input operation. Alternatively, when the work item is (3) to charge the battery of the vehicle 10 by connecting the charging connector of the charger to the charging port of the vehicle 10, the control unit 18 may detect that the work item is started by detecting that the charging connector is connected to the charging port by the sensing unit 13. When detecting that a work item included in the charging work to the vehicle 10 has been started, the control unit 18 transmits a start notification of the work item to the server 20 via the communication unit 11. The start notification of the work item may be, for example, a notification indicating that the door of the room of the vehicle 10 is unlocked by a predetermined digital key, a notification indicating that the lever or button has received a predetermined input operation, or a notification indicating that the charging connector is connected to the charging port.

In S202, when the start notification of the work item is received from the vehicle 10, the control unit 25 of the server 20 starts measuring the elapsed time from the start of the work item.

In S203, the control unit 18 of the vehicle 10 detects that the operation items included in the operation of charging the vehicle 10 have been completed.

An arbitrary method can be adopted for detecting that the work item has been completed. For example, the control unit 18 of the vehicle 10 may detect information indicating that the work item has ended via the communication unit 11, the sensing unit 13, the input unit 16, or the like. For example, in a case where the work item is to (1) unlock the door of the living room of the vehicle 10 using the predetermined digital key, the control unit 18 may detect that the work item has ended by receiving a lock request accompanied by the predetermined digital key via the communication unit 11. When the work item is (2) to open the cover of the charging port of the vehicle 10 by operating a lever or a button such as under the driver's seat, the control unit 18 may detect that the work item has been started by detecting that the cover of the charging port of the vehicle 10 has been closed by the sensing unit 13. Alternatively, when the work item is (3) to charge the battery of the vehicle 10 by connecting the charging connector of the charger to the charging port of the vehicle 10, the control unit 18 may detect that the work item has been started by detecting that the charging connector has been removed from the charging port by the sensing unit 13. When the control unit 18 detects that the work item included in the charging work to the vehicle 10 has ended, it transmits an end notification of the work item to the server 20 via the communication unit 11. The end notification of the work item may be, for example, a notification indicating that the door of the room of the vehicle 10 is locked by a predetermined digital key, a notification indicating that the cover of the charging port of the vehicle 10 is closed, or a notification indicating that the charging connector is removed from the charging port.

In S204, the control unit 25 of the server 20 starts measuring the elapsed time from the beginning of the work item in S202, and then ends the measurement of the elapsed time of the work item when the work time associated with the work item has expired or when the end notification of the work item has been received. Then, after receiving the start notification of the work item from the vehicle 10, the control unit 25 determines whether or not the end notification of the work item has been received from the vehicle 10 until the work time associated with the work item expires.

In S204, when the control unit 25 of the server 20 determines that the completion notification of the work item has been received from the vehicle 10 before the work time associated with the work item expires (Yes in S204), S207 process is executed.

On the other hand, in S204, the control unit 25 of the server 20 executes S205 and S206 processes when it is determined that the completion notification of the work item has not been received from the vehicle 10 until the work time associated with the work item expires (No in S204).

In S205, the control unit 25 of the server 20 receives the start notification of the work item from the vehicle 10, and then outputs an alert when the end notification of the work item is not received from the vehicle 10 until the work time associated with the work item expires.

Any method can be used for outputting the alert. The control unit 25 of the server 20 may display information, output sound or light via the output unit 22. Alternatively, the control unit 25 may transmit a request for outputting an alert to the terminal device 30A of the user or the terminal device 30B of the worker via the communication unit 21. In this case, the terminal device 30A or 30B may output an alert via a display or the like based on the request received from the servers 20. As a result, the server 20 can prompt the user or the worker of the vehicle charging service to confirm that no abnormality has occurred in the charging operation to the vehicle 10. This makes it possible for the user or the worker to recognize at an early stage that the worker is performing a work other than the work to be performed originally, or that the worker has left the site without locking the vehicle.

In S206, the control unit 25 of the server 20 receives the start notification of the work item from the vehicle 10, and then, when the end notification of the work item is not received from the vehicle 10 until the work time expires, outputs a request for starting the imaging by the in-vehicle camera of the vehicle 10.

Any method can be adopted for the output of the request for starting the imaging. The control unit 25 of the server 20 may transmit a request for starting imaging to the vehicle 10 via the communication unit 21. In this case, the control unit 18 of the vehicle 10 can start imaging inside or outside the vehicle 10 via the imaging unit 14 based on the request received from the server 20, and can transmit the captured image to the server 20. The control unit 25 of the server 20 can store the image received from the vehicle 10 in the storage unit 24. Alternatively, the control unit 25 may transmit the images received from the vehicles 10 to the terminal device 30A of the user or the terminal device 30B of the worker via the communication unit 21.

The above-described S205 and S206 processes may be performed, in particular, when the charging operation includes unlocking the doors of the living rooms of the vehicles 10 as work items. That is, after receiving the start notification of the work item from the vehicle 10, the control unit 25 of the server 20 may output at least one of an alert or a request to start imaging by the in-vehicle camera of the vehicle 10 when the end notification of the work item is not received from the vehicle 10 until the work time associated with the work item expires. When the door of the living room of the vehicle 10 is unlocked by the worker, the user is particularly likely to feel anxiety in terms of security, which is beneficial.

In S207, the control unit 25 of the servers 20 determines whether all the work items included in the charge work of the vehicles 10 have been completed. In a case where it is determined that all the work items have been completed, the control unit 25 may end the present processing. On the other hand, when the control unit 25 determines that there is a work item that has not been completed, the present processing may be continued.

As described above, the server 20 according to the present embodiment stores the work items included in the charging work to the vehicle 10 and the work times thereof in association with each other. After receiving the start notification of the work item from the vehicle 10, the server 20 outputs an alert when the end notification of the work item is not received from the vehicle 10 before the work time expires.

According to such a configuration, an alert is output to, for example, a user or a terminal device of the worker in a case where it takes more time than expected for a predetermined work by the worker, or in a case where the worker leaves the site without using a key of the vehicle. Thus, even in a case where the user who is the owner of the vehicle 10 or the like leaves the charging work of the vehicle to the worker in a state where the user is not present at the site, it is possible to reduce the anxiety of the user. Therefore, according to the present embodiment, it is possible to improve the convenience of the service of dispatching the worker to charge the vehicle.

Although the present disclosure has been described with reference to the drawings and examples, various modifications and changes may be made by those skilled in the art based on the present disclosure. Accordingly, these variations and modifications are within the scope of the present disclosure. For example, the functions included in the configurations, steps, etc. can be rearranged so as not to be logically inconsistent, and a plurality of configurations, steps, etc. can be combined into one or divided.

For example, in the embodiment disclosed, the function of the server 20, the function described as the process of the server 20, or all or some of the process may be implemented as the function or the process of the vehicle 10. Specifically, a program describing the contents of the processing for realizing all or part of the functions or the processing of the server 20 according to the embodiment may be stored in the storage unit 17 of the vehicle 10, and the control unit 18 may read and execute the program.

Further, for example, an embodiment in which a general-purpose computer functions as the control unit 18 or the server 20 of the vehicle 10 according to the above-described embodiment is also possible. Specifically, a program describing processing contents for realizing the functions of the control unit 18 of the vehicle 10 or the server 20 according to the above-described embodiment is stored in a memory of a general-purpose computer, and the program is read and executed by the processor. Accordingly, the present disclosure can also be implemented as a program executable by a processor or a non-transitory computer-readable medium storing the program. Examples of the non-transitory computer-readable medium include a magnetic recording device, an optical disk, a magneto-optical recording medium, and a semiconductor memory.

What is claimed is:

1. A control method executed by a computer configured to communicate with a vehicle, the control method comprising:
    storing an operation item included in a charging operation to the vehicle and an operation time corresponding to the operation item, in association with each other; and
    outputting an alert in a case where an end notification of the operation item is not received from the vehicle before the operation time expires after a start notification of the operation item is received from the vehicle.

2. The control method according to claim 1, wherein the operation time is updated based on at least one of vehicle information of the vehicle, environment information associated with the charging operation, or history information related to past operations.

3. The control method according to claim 1, further comprising outputting a request for starting capturing an image by an in-vehicle camera of the vehicle in the case where the end notification is not received from the vehicle before the operation time expires after the start notification is received from the vehicle.

4. The control method according to claim 1, wherein the charging operation includes, as a first operation item, unlocking a door of a vehicle cabin of the vehicle.

5. The control method according to claim 4, further comprising transmitting a digital key corresponding to the door to a terminal device associated with an operator performing the charging operation, wherein a start notification of the first operation item is a notification indicating that the door is unlocked by the digital key, and an end notification of the first operation item is a notification indicating that the door is locked by the digital key.

6. The control method according to claim 1, wherein the alert is output to a terminal device associated with a user of the vehicle or an operator performing the charging operation, and the alert includes at least one of a visual notification, an audio notification, or a transmission of a message to the terminal device.

7. The control method according to claim 1, wherein the operation item includes connecting a charging connector to a charging port of the vehicle, and the end notification is based on detecting removal of the charging connector.

8. The control method according to claim 2, wherein the environment information includes at least one of a charging location, a time zone of the charging operation, or a weather condition at the charging location.

9. The control method according to claim 2, wherein the history information includes a cumulative count or a statistical record of elapsed operation times for corresponding operation items performed on a same or similar vehicle models.

10. The control method according to claim 3, wherein the image captured by the in-vehicle camera is transmitted to a server or a terminal device associated with a user of the vehicle or an operator performing the charging operation.

11. The control method according to claim 5, wherein the digital key is transmitted from a server to the terminal device via a wireless network prior to initiation of the charging operation.

12. The control method according to claim 5, wherein the start notification and the end notification of the first operation item are determined based on unlocking and locking of the door detected by the vehicle using the digital key.

13. A control method executed by a computer configured to communicate with a vehicle, the control method comprising:

transmitting a digital key to a terminal device associated with an operator to initiate a charging operation on the vehicle;

receiving, from the vehicle, a start notification indicating that an operation item has begun using the digital key;

measuring an elapsed time from receipt of the start notification;

determining whether an end notification indicating completion of the operation item is received from the vehicle before expiration of a predetermined operation time; and in a case where the end notification is not received before expiration of the operation time, outputting an alert, wherein the operation item includes at least one of unlocking a cabin door of the vehicle or connecting a charging connector to a charging port of the vehicle.

14. The control method according to claim 13, wherein the end notification indicates that the cabin door has been locked using the digital key, and the operation time is determined based on at least one of a type of the vehicle, environmental conditions, or history information related to past operations.

15. The control method according to claim 13, wherein the end notification indicates that the charging connector has been removed from the charging port, and the operation time is determined based on at least one of a type of the vehicle, environmental conditions, or history information related to past operations.

16. The control method according to claim 13, further comprising:

transmitting a request to start image capturing by an in-vehicle camera in a case where the end notification is not received before expiration of the operation time.

* * * * *